US010674143B2

United States Patent
Gruhlke et al.

(10) Patent No.: US 10,674,143 B2
(45) Date of Patent: Jun. 2, 2020

(54) SYSTEM FOR EYE TRACKING

(71) Applicant: QUALCOMM Incorporated, San Diego, CA (US)

(72) Inventors: Russell Gruhlke, San Jose, CA (US); Venkat Rangan, San Diego, CA (US); Ravishankar Sivalingam, San Jose, CA (US); Kebin Li, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/973,182

(22) Filed: May 7, 2018

(65) Prior Publication Data

US 2018/0332275 A1 Nov. 15, 2018

Related U.S. Application Data

(60) Provisional application No. 62/505,613, filed on May 12, 2017.

(51) Int. Cl.
*H04N 13/383* (2018.01)
*F21V 8/00* (2006.01)
(Continued)

(52) U.S. Cl.
CPC ........... *H04N 13/383* (2018.05); *G02B 6/005* (2013.01); *G02B 27/0093* (2013.01);
(Continued)

(58) Field of Classification Search
CPC ...... H04N 13/383; H04N 13/344; H04N 5/33; H04N 13/332; G02B 27/0093; G02B 27/0172; G02B 6/005
See application file for complete search history.

(56) References Cited

U.S. PATENT DOCUMENTS

2011/0109528 A1 5/2011 Mun et al.
2013/0077049 A1 3/2013 Bohn
(Continued)

FOREIGN PATENT DOCUMENTS

WO WO-2016046514 A1 3/2016

OTHER PUBLICATIONS

International Search Report and Written Opinion—PCT/US2018/031531—ISA/EPO—dated Sep. 17, 2018.
(Continued)

*Primary Examiner* — Tracy Y. Li
(74) *Attorney, Agent, or Firm* — Harrity & Harrity, LLP/Qualcomm Incorporated

(57) ABSTRACT

Certain aspects of the present disclosure relate to a system. In some aspects, the system may include an emitter configured to emit a light. The system may include a light guide configured to direct the light toward a pupil of an eye. The light guide may include a directing portion configured to propagate the light. The light guide may include a turning portion configured to receive light from the directing portion and direct the light toward the pupil of the eye and configured to receive reflected light directed from the pupil of the eye and direct the reflected light toward the directing portion. The system may include a receiver configured to receive the reflected light from the light guide. The system may include a processor configured to determine a gaze direction of the pupil of the eye based at least in part on the reflected light received by the receiver.

30 Claims, 8 Drawing Sheets

(51) Int. Cl.
*H04N 13/332* (2018.01)
*H04N 5/33* (2006.01)
*G02B 27/01* (2006.01)
*H04N 13/344* (2018.01)
*G02B 27/00* (2006.01)

(52) U.S. Cl.
CPC ........... *G02B 27/0172* (2013.01); *H04N 5/33* (2013.01); *H04N 13/332* (2018.05); *H04N 13/344* (2018.05)

(56) References Cited

U.S. PATENT DOCUMENTS

| | | | |
|---|---|---|---|
| 2014/0191928 A1* | 7/2014 | Kobayashi | G02B 27/0172 345/8 |
| 2015/0138451 A1 | 5/2015 | Amitai et al. | |
| 2015/0185475 A1 | 7/2015 | Saarikko et al. | |
| 2016/0073002 A1* | 3/2016 | Du | G06F 3/0488 382/100 |
| 2016/0085300 A1 | 3/2016 | Robbins et al. | |
| 2016/0202753 A1* | 7/2016 | Lee | G02B 27/0172 345/8 |
| 2016/0223819 A1* | 8/2016 | Liu | G02B 27/0172 |
| 2016/0270656 A1* | 9/2016 | Samec | A61B 3/085 |
| 2017/0068091 A1* | 3/2017 | Greenberg | G06F 3/013 |

OTHER PUBLICATIONS

Partial International Search Report—PCT/US2018/031531—ISA/EPO—dated Jul. 25, 2018.

\* cited by examiner

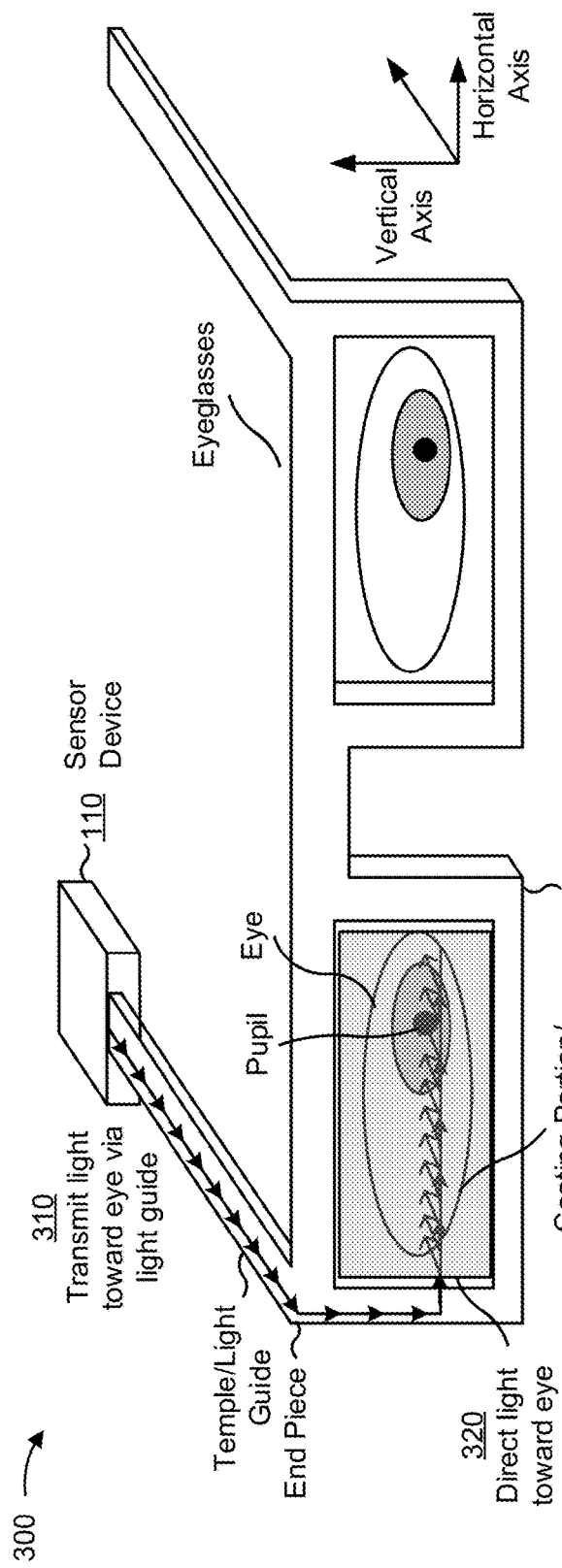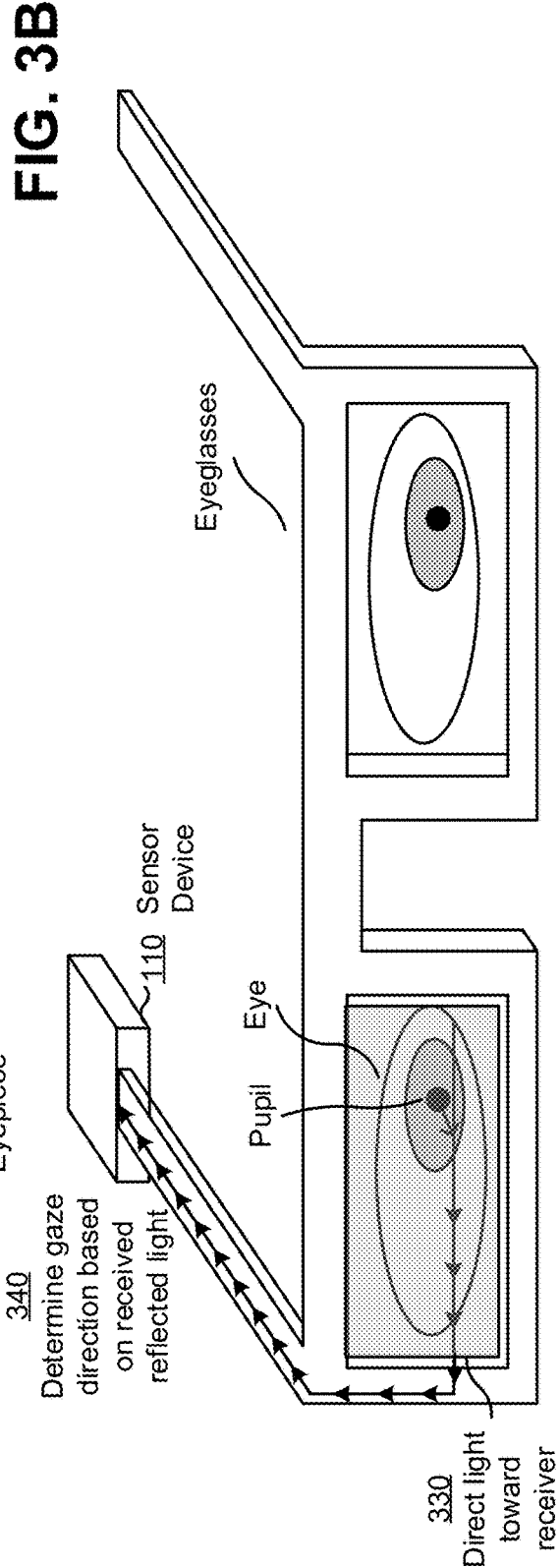
FIG. 3B

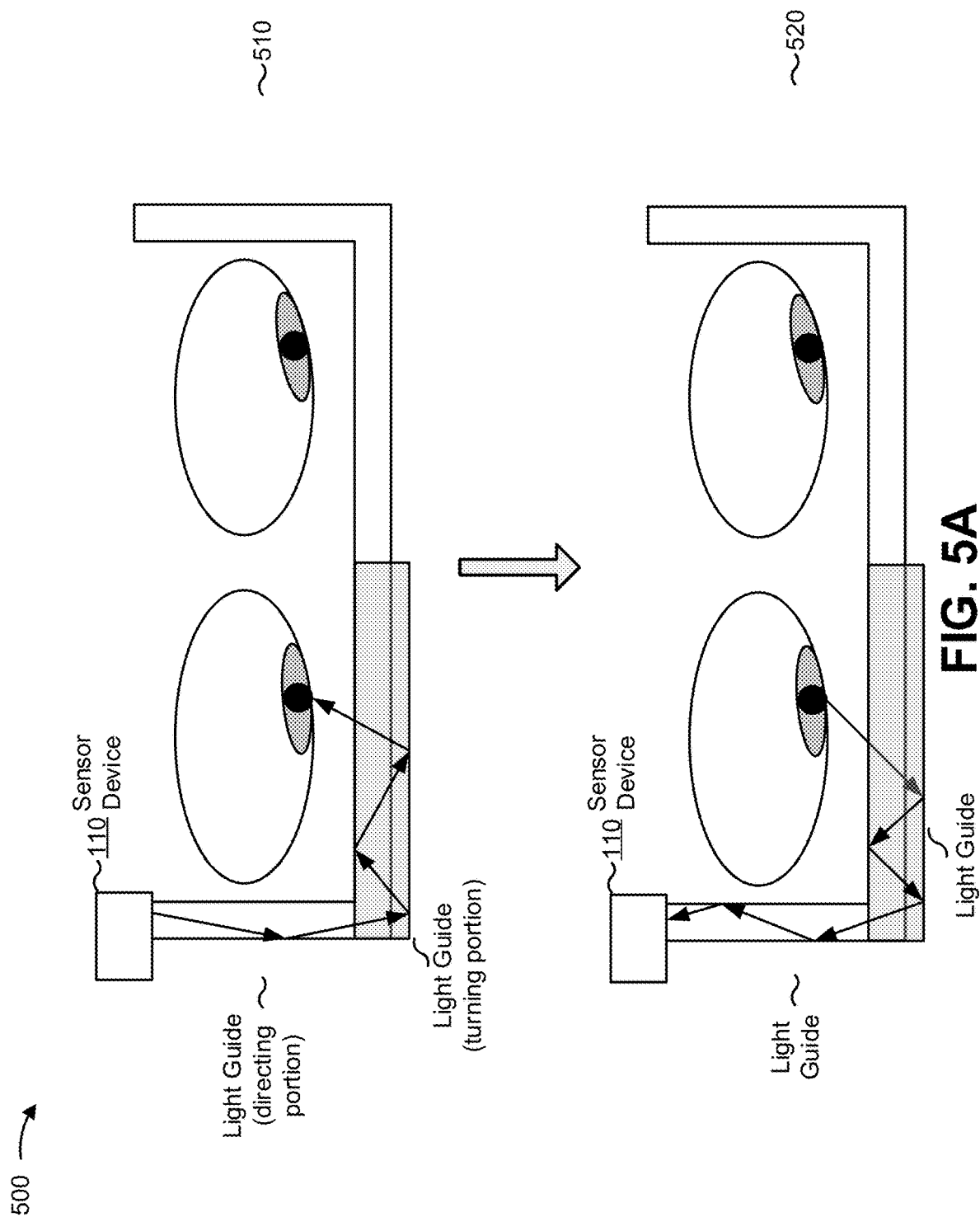

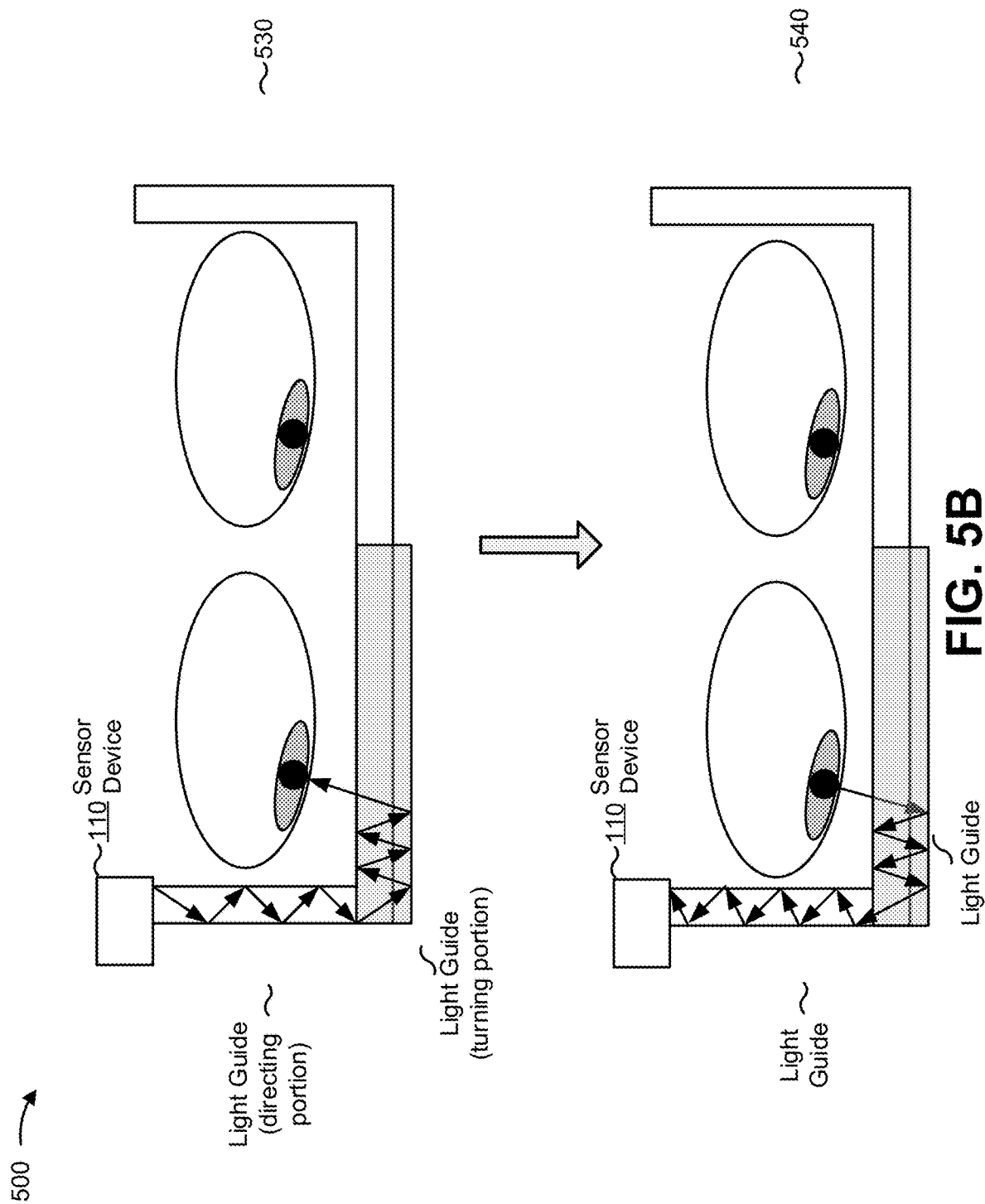

SYSTEM FOR EYE TRACKING

CROSS-REFERENCE TO RELATED APPLICATIONS UNDER 35 U.S.C. § 119

This application claims priority to Provisional Patent Application No. 62/505,613, filed on May 12, 2017, entitled "SYSTEM FOR EYE TRACKING," which is hereby expressly incorporated by reference herein.

FIELD OF THE DISCLOSURE

Aspects of the present disclosure generally relate to a system, and more particularly to a system for eye tracking.

BACKGROUND

A pair of smart eyeglasses may provide information for display to a user wearing the pair of smart eyeglasses. The pair of smart eyeglasses may include a camera mounted at an upper corner of the smart eyeglasses, such as at a hinge of the smart eyeglasses or an end piece of the smart eyeglasses. The camera may be used to capture image information regarding an eye, and utilize the image information to determine information regarding a position of the eye. For example, the camera may be used to determine a gaze direction of the eye.

SUMMARY

In some aspects, a system may include an emitter configured to emit a light. The system may include a light guide configured to direct the light toward a pupil of an eye. The light guide may include a directing portion configured to propagate the light. The light guide may include a turning portion configured to receive light from the directing portion and direct the light toward the pupil of the eye and configured to receive reflected light directed from the pupil of the eye and direct the reflected light toward the directing portion. The system may include a receiver configured to receive the reflected light from the light guide. The system may include a processor configured to determine a gaze direction of the pupil of the eye based at least in part on the reflected light received by the receiver.

In some aspects, a method may include transmitting, by a device, light toward a pupil of an eye. The light may be directed by a directing portion of a light guide to a turning portion of the light guide. The light may be directed toward the pupil of the eye by the turning portion. Reflected light may be directed by the turning portion to the directing portion. The reflected light may be directed by the directing portion to a receiver. The method may include receiving, by the device, the reflected light based at least in part on transmitting the light toward the pupil of the eye. The method may include determining, by the device, a gaze direction based at least in part on receiving the reflected light.

In some aspects, a non-transitory computer-readable medium may store one or more instructions that, when executed by one or more processors of a device, cause the one or more processors to transmit light toward a pupil of an eye. The light may be directed by a directing portion of a light guide to a turning portion of the light guide. The light may be directed toward the pupil of the eye by the turning portion. Reflected light may be directed by the turning portion to the directing portion. The reflected light may be directed by the directing portion to a receiver. The one or more instructions, when executed by the one or more processors, may cause the one or more processors to receive the reflected light based at least in part on transmitting the light toward the pupil of the eye. The one or more instructions, when executed by the one or more processors, may cause the one or more processors to determine a gaze direction based at least in part on receiving the reflected light.

In some aspects, an apparatus may include means for transmitting light toward a pupil of an eye. The light may be directed by a directing portion of a light guide to a turning portion of the light guide. The light may be directed toward the pupil of the eye by the turning portion. Reflected light may be directed by the turning portion to the directing portion. The reflected light may be directed by the directing portion to a receiver. The apparatus may include means for receiving the reflected light based at least in part on transmitting the light toward the pupil of the eye. The apparatus may include means for determining a gaze direction based at least in part on receiving the reflected light.

Aspects generally include a method, apparatus, system, device, computer program product, smart eye glasses, eye wear, a head-mounted display, and processing system as substantially described herein with reference to and as illustrated by the accompanying specification and drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A and 3B are diagrams of an example of determining a gaze direction using a system for eye tracking, in accordance with various aspects of the present disclosure.

FIGS. 5A and 5B are diagrams of an example of determining a gaze direction using a system for eye tracking, in accordance with various aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

Eye movements may be tracked to determine an input to a user interface, to determine information about a user, and/or the like. For example, a pair of smart eyeglasses may include a camera mounted to the pair of smart eyeglasses to obtain an image of a user's eyes. The camera may be mounted to a corner of the pair of smart eyeglasses, such as to a hinge of the pair of smart eyeglasses, an end piece of the pair of smart eyeglasses, and/or the like. However, positioning a camera at a corner of the pair of smart eyeglasses may result in an excessively shallow angle between the camera and a pupil of an eye, which may excessively reduce an accuracy of a gaze direction determination and/or excessively increase computational complexity to determine the gaze direction. Moreover, positioning the camera at the corner of the pair of smart eyeglasses may result in an eyelid or in eyelashes of the user being an obstruction between the pupil of the eye and the camera. Furthermore, utilizing a camera to obtain images of a pupil of the eye to perform gaze direction tracking may result in an excessive utilization of energy resources, which may result in less than a threshold amount of battery life for the pair of smart eyeglasses.

Some aspects, described herein, may provide a system for eye tracking that utilizes a turning element to direct light toward a pupil of an eye and direct reflected light from the pupil of the eye toward a receiver to determine a gaze direction. In this way, an accuracy of a gaze direction determination may be improved relative to other techniques for gaze direction determination. Moreover, based at least in part on the turning element being disposed onto an eyepiece of a pair of eyeglasses, such as using a holographic film coated onto the eyepiece, a likelihood of the pupil being obstructed is reduced relative to other techniques for gaze direction determination. Furthermore, based at least in part on using a receiver to determine a characteristic of received light (e.g., an angle or a spatial position) to perform gaze direction determination, some aspects, described herein, may reduce energy utilization relative to capturing images of the pupil to perform gaze direction determination.

Figure 1:
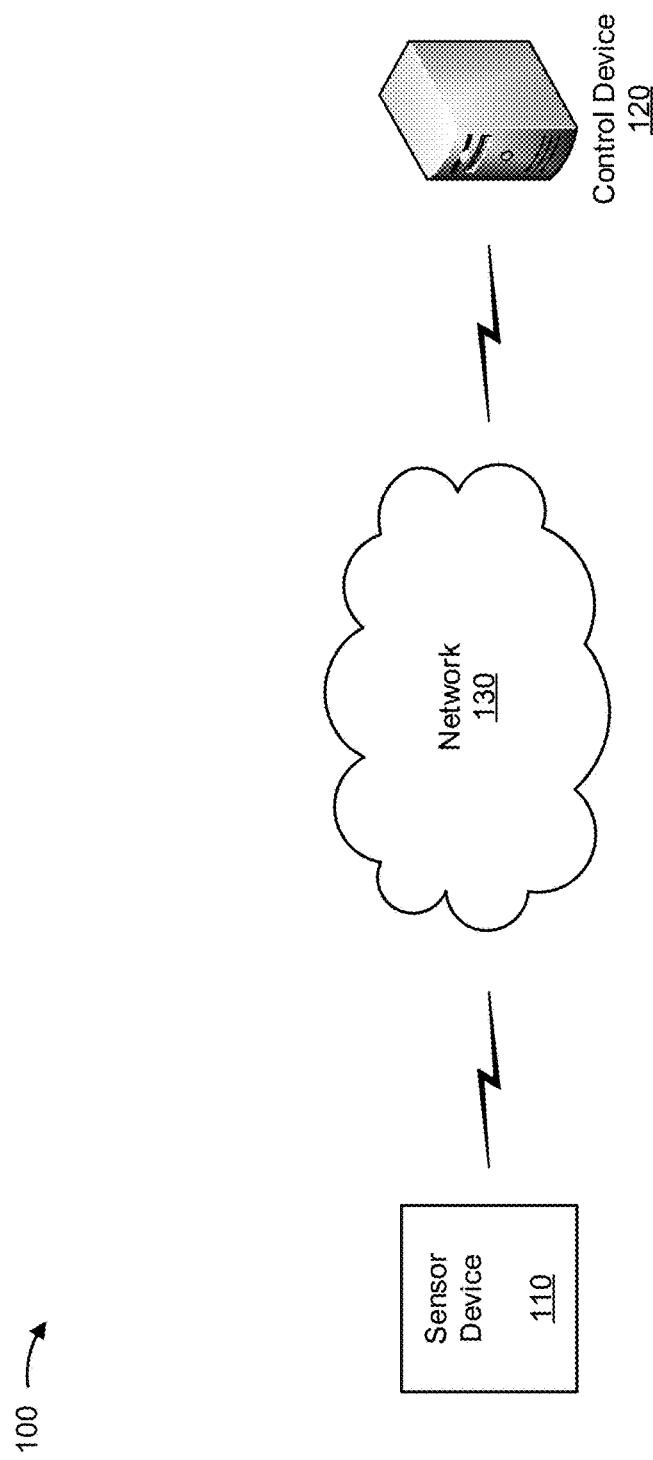
FIG. 1 is a diagram of an example environment in which systems and/or methods, described herein, may be implemented, in accordance with various aspects of the present disclosure.

FIG. 1 is a diagram of an example environment 100 in which systems and/or methods, described herein, may be implemented. As shown in FIG. 1, environment 100 may include sensor device 110, control device 120, and network 130. Devices of environment 100 may interconnect via wired connections, wireless connections, or a combination of wired and wireless connections.

Sensor device 110 includes one or more devices associated with receiving, generating, storing, processing, and/or providing data regarding a gaze direction. For example, sensor device 110 may include an infrared light sensor that detects an angle and/or a spatial position of reflected light incident on a receiver of sensor device 110. In some aspects, sensor device 110 may be a system for sensing that includes an emitter to emit light (e.g., infrared light), a light guide to direct light, a receiver to receive reflected light, and a processor to determine a gaze direction. In some aspects, sensor device 110 may be mounted to and/or include an eyeglass structure with an eyepiece. For example, an emitter and receiver of sensor device 110 may be integrated into a frame of a pair of eyeglasses, a light guide of sensor device 110 may be integrated into the frame and the eyepiece of the pair of eyeglasses, and/or the like. In this case, the light guide may include a directing portion (e.g., integrated into a temple and/or a hinge of the pair of eyeglasses) to direct light between the emitter/receiver and a turning portion, and may include the turning portion (e.g., coated onto an eyepiece or lens of the pair of eyeglasses) to redirect light between the directing portion and a pupil of an eye.

Although some aspects, described herein, are described in terms of a pair of smart eyeglasses, other aspects are possible, such as gaze direction determination for a head-mounted display, a pair of eyeglasses, a virtual reality controller, an augmented reality controller, and/or the like.

In some aspects, sensor device 110 may include an emitter configured to emit a light; a light guide configured to direct the light toward a pupil of an eye, wherein the light guide may include a directing portion configured to propagate the light, wherein the light guide may include a turning portion configured to receive light from the directing portion and direct the light toward the pupil of the eye and configured to receive reflected light directed from the pupil of the eye and direct the reflected light toward the directing portion; a receiver configured to receive the reflected light from the light guide; and a processor configured to determine a gaze direction of the pupil of the eye based at least in part on the reflected light received by the receiver.

In some aspects, the emitter is an infrared light emitting diode. In some aspects, the turning portion includes a holographic film attached to an eyepiece, a micro-structured element, a surface relief diffractive element, a mirror, and/or the like. In some aspects, the turning portion is aligned to within a threshold proximity of a center point of the eye. In some aspects, the turning portion is configured to direct the light so that the light strikes the eye over a plurality of different angles. In some aspects, the reflected light is reflected by the eye over a plurality of different angles. In some aspects, the processor is configured to determine the gaze direction based at least in part on an angle of incidence of the reflected light on the turning portion or a wavelength of the reflected light at incidence with the turning portion.

In some aspects, a path of the reflected light through the directing portion toward the receiver is related to a position of the pupil of the eye. In some aspects, the processor is configured to determine the gaze direction based at least in part on an angle of incidence or a spatial position of incidence of the reflected light on the receiver. In some aspects, the receiver is a pseudo imaging sensor. In some aspects, the processor is configured to determine the gaze direction based at least in part on a pattern of incident light on the receiver. In some aspects, the processor is configured to determine the gaze direction based at least in part on a regression algorithm, a computer vision algorithm, a machine learning regression model, a neural network, and/or the like. In some aspects, the light guide is a fiber bundle with a collection lens configured to image the reflected light onto a collection end of the fiber bundle and toward the receiver. In some aspects, the fiber bundle includes a non-uniform distribution of fibers.

In some aspects, the turning portion is horizontally distributed on an eyepiece aligned to the eye. In some aspects, the turning portion is vertically distributed on an eyepiece aligned to the eye. In some aspects, the turning portion comprises a plurality of rows or a plurality of columns of turning portions. In some aspects, the processor is configured to determine the gaze direction in one axis. In some aspects, the processor is configured to determine the gaze direction in a two axes. In some aspects, the processor is configured to determine the gaze direction based at least in part on an intensity of the reflected light. In some aspects, the system comprises an eyeglass structure, and the eyeglass structure includes at least one eyepiece.

Control device 120 includes one or more devices associated with receiving, generating, storing, processing, and/or providing data relating to gaze direction determination. For example, control device 120 may include a mobile phone (e.g., a smart phone, a user equipment), an Internet of Things (IoT) device, a computer (e.g., a desktop computer, a laptop computer, a tablet computer), a server, and/or the like that communicates with sensor device 110. In some aspects, control device 120 may include one or more components of a pair of smart eyeglasses that receive a gaze direction determination from sensor device 110 and utilizes the gaze direction determination as an input to a user interface (e.g., to alter information provided via a screen of the smart eyeglasses). In some aspects, control device 120 may include a calibration device to calibrate sensor device 110. For example, control device 120 may cause a set of indications to be provided via a display interface, an audio interface, a haptic feedback interface, or the like to instruct a user to alter a gaze direction in a known pattern, and may calibrate an algorithm for gaze direction determination based at least in part on information obtained by sensor device 110 regarding reflected light from a pupil of an eye of the user and the known pattern.

Network 130 includes one or more wired and/or wireless networks. For example, network 130 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. In some aspects, network 130 may include an air interface, an optical fiber connection, an electrical wire connection, and/or the like.

The number and arrangement of devices and networks shown in FIG. 1 are provided as an example. In practice, there may be additional devices, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
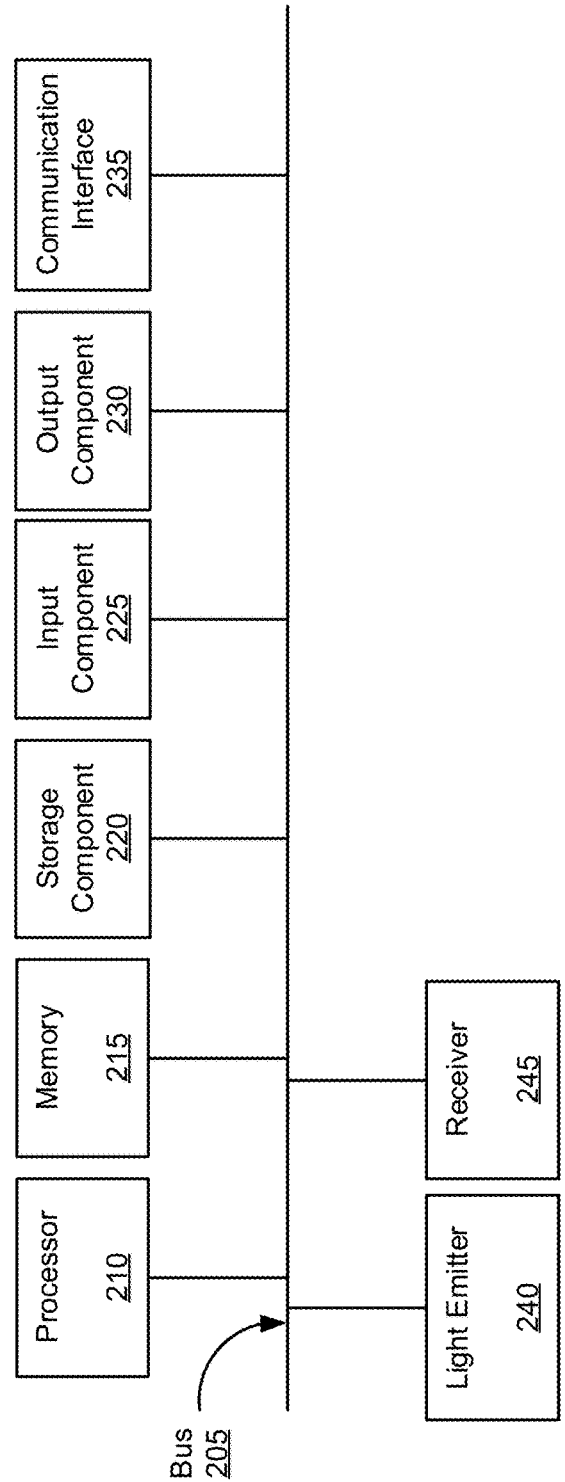
FIG. 2 is a diagram of example components of one or more devices of FIG. 1, in accordance with various aspects of the present disclosure.

FIG. 2 is a diagram of example components of a device 200. Device 200 may correspond to sensor device 110 and/or control device 120. In some aspects, sensor device 110 and/or control device 120 may include one or more devices 200 and/or one or more components of device 200. As shown in FIG. 2, device 200 may include a bus 205, a processor 210, a memory 215, a storage component 220, an input component 225, an output component 230, a communication interface 235, a light emitter 240, and a receiver 245.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a sensor for sensing information (e.g., a global positioning system (GPS) component, an accelerometer, a gyroscope, and/or an actuator). Output component 230 includes a component that provides output information from device 200 (e.g., a display, a speaker, and/or one or more light-emitting diodes (LEDs)).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency (RF) interface, a universal serial bus (USB) interface, a Wi-Fi interface, a cellular network interface, and/or the like.

Light emitter 240 includes a light emitting component that enables device 200 to emit light toward a pupil of an eye to cause the light to be reflected toward receiver 245 for sensing. For example, light emitter 240 may include an infrared spectrum emitter (e.g., a light emitting diode) associated with a transmit power that satisfies a threshold (e.g., a visibility threshold, a safety threshold, etc.). In some aspects, light emitter 240 may be optically coupled to a light guide to direct the light toward a pupil of an eye.

Receiver 245 includes a sensing component that enables device 200 to determine information regarding light emitted from light emitter 240 and reflected by, for example, a pupil of an eye. For example, receiver 245 may include an infrared spectrum sensor element. In some aspects, receiver 245 may include an array of sensor elements. In some aspects, receiver 245 may capture information regarding the reflected light. For example, receiver 245 may be a pseudo imaging sensor that captures information identifying an intensity of the reflected light, an angle of incidence of the reflected light on receiver 245, a position of incidence of the reflected light on receiver 245, and/or the like. In this way, receiver 245 may enable gaze direction determination with reduced energy utilization, processing complexity, and/or cost relative to another type of sensor that captures an image of, for example, an eye to determine a gaze direction. In some aspects, receiver 245 may be optically coupled to a light guide to receive reflected light (e.g., reflected by a pupil of an eye) from the light guide.

Device 200 may perform one or more processes described herein. Device 200 may perform these processes in response to processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

Figure 6:
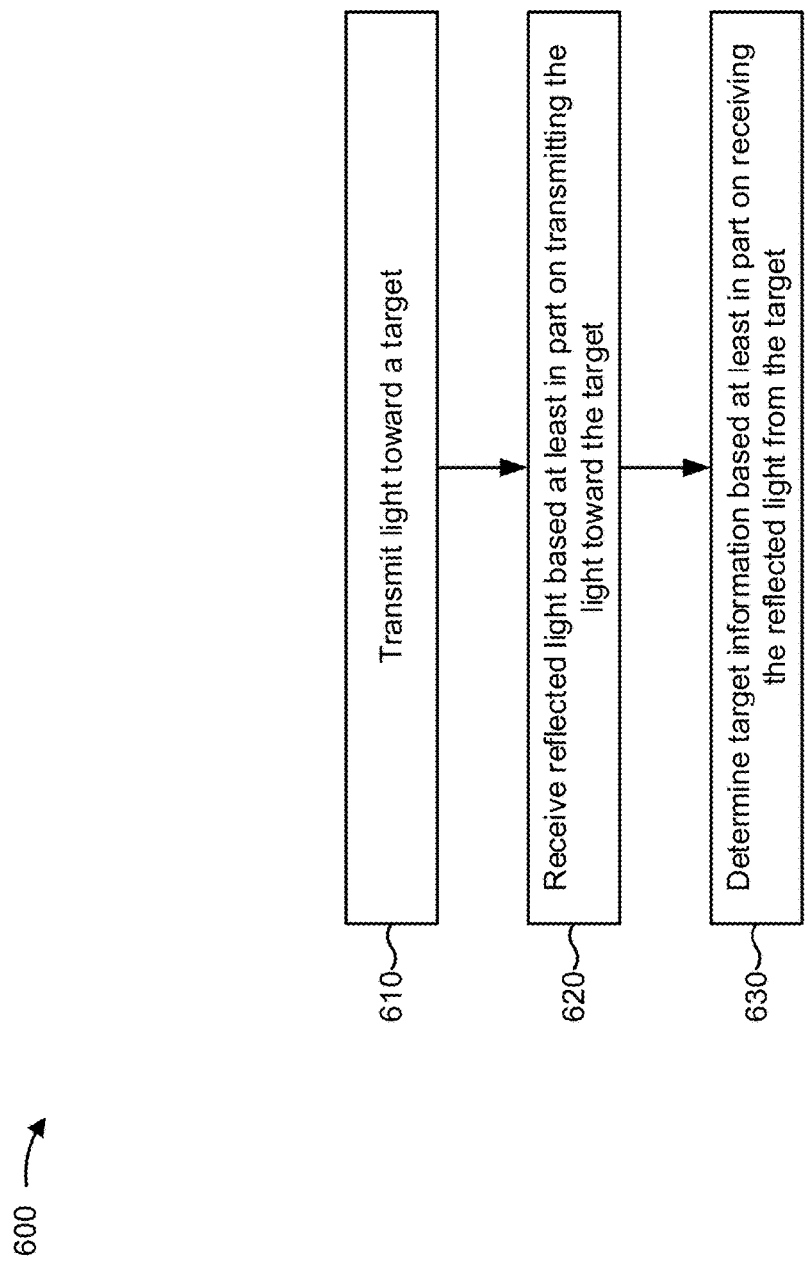
FIG. 6 is a flow chart of an example process performed, for example, by a sensor device of a system for eye tracking, in accordance with various aspects of the present disclosure.

In some aspects, device 200 includes means for performing one or more processes described herein and/or means for performing one or more operations of the processes described herein, such as process 600 of FIG. 6 and/or one or more other processes described herein (e.g., with regard to FIGS. 3A-5B). For example, the means for performing the processes and/or operations described herein may include bus 205, processor 210, memory 215, storage component 220, input component 225, output component 230, communication interface 235, light emitter 240, receiver 245, and/or any combination thereof.

In some aspects, sensor device 110 may include means for transmitting light toward a pupil of an eye, means for receiving reflected light based at least in part on transmitting the light toward the pupil of the eye, means for determining a gaze direction based at least in part on receiving the reflected light, and/or the like. In some aspects, such means may include one or more components of device 200 described in connection with FIG. 2.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3A:
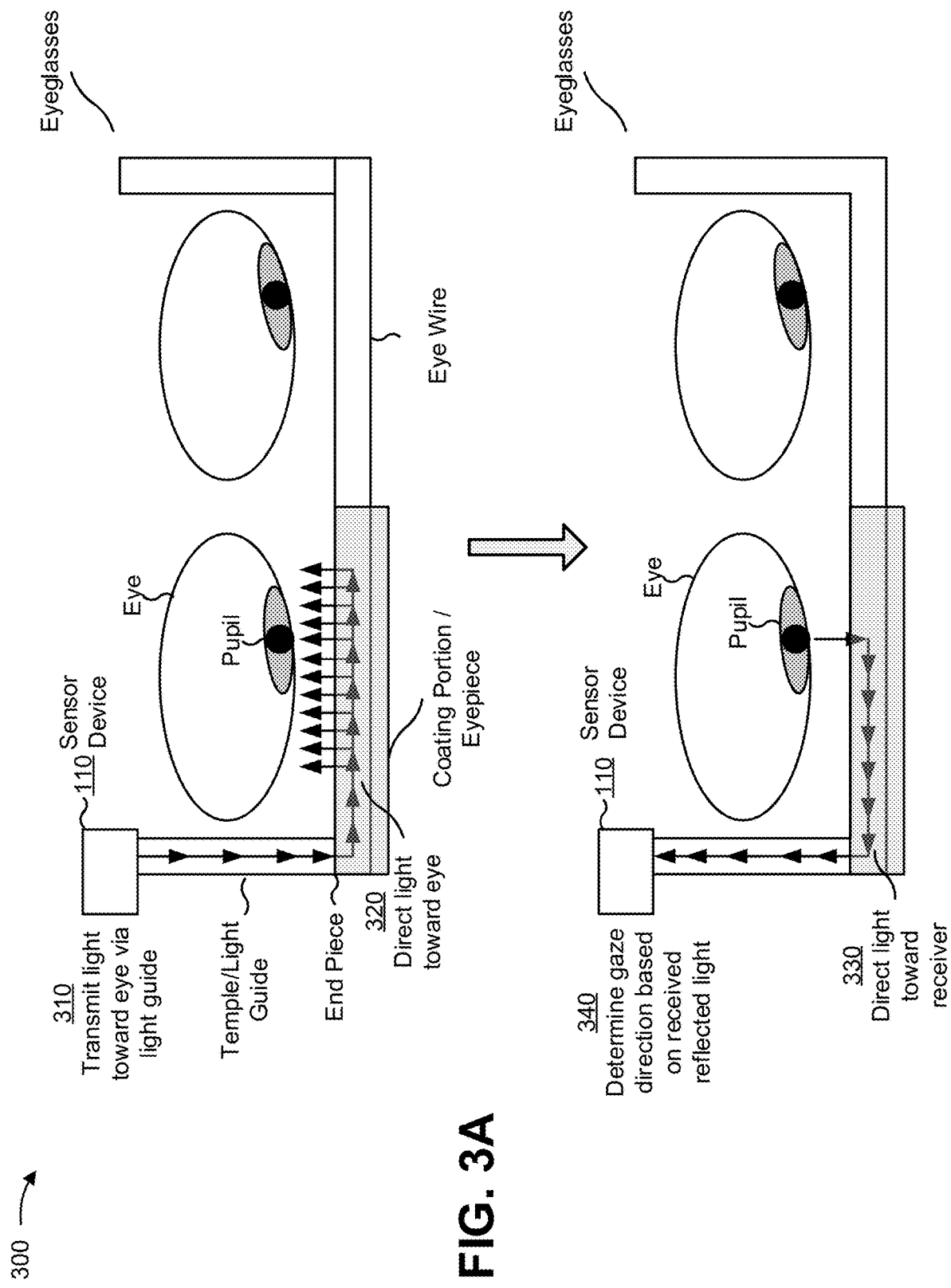

FIGS. 3A and 3B are diagrams of an example aspect 300. FIGS. 3A and 3B show an example of determining a gaze direction using a system for eye tracking. As shown in FIG. 3A, a system for eye tracking may include a sensor device 110 optically coupled to a light guide, which includes a directing portion integrated into a temple and end piece of a pair of eyeglasses, and a turning portion integrated into an eyepiece of the pair of eyeglasses (e.g., the turning portion includes the eyepiece and a coating portion disposed onto the eyepiece).

As shown in FIGS. 3A and 3B, and by reference number 310, sensor device 110 (e.g., an emitter) transmits light toward an eye via the light guide. For example, sensor device 110 may be optically coupled to a directing portion of the light guide, and may emit infrared light using a light emitting diode. As shown by reference number 320, the light guide may direct the light toward a pupil of an eye. For example, the directing portion of the light guide may direct the light to a turning portion of a light guide, which may direct the light toward the pupil of the eye. In this case, the coating portion (e.g., a holographic film) of the turning portion may cause a portion of the light directed using the light guide to be turned toward the pupil of the eye. In some aspects, the turning portion of the light guide may include a micro-structured element, a surface relief diffractive element, a mirror, and/or the like turn the light toward the pupil of the eye. Additionally, or alternatively, sensor device 110 may be coupled to a fiber bundle with a collection lens. In this case, the fiber bundle may cause light to be directed toward the pupil of the eye, and reflected light may be received at the collection lens to be directed via the fiber bundle to sensor device 110. In some aspects, the fiber bundle may include a non-uniform distribution of fibers, such as a random pattern of fibers, a pseudo-random pattern of fibers, and/or the like, and sensor device 110 may utilize a statistical technique to determine the gaze direction based at least in part on reflected light received via the non-uniform distribution of fibers. The randomness in fiber position from one end of the fiber bundle to the other end results in a pattern generated on sensor device 110 corresponding to eye pupil position or gaze direction. In this way, using a fiber bundle with random placement of fibers enables generation of a unique pattern on sensor device 110 that can identify eye pupil position and/or eye gaze direction.

In some aspects, the turning portion may be aligned to the pupil of the eye. For example, the coating portion may be applied so that light is directed from the coating portion and the eyepiece to the pupil of the eye and to enable sensor device 110 to determine the gaze direction. In some aspects, the turning portion may be horizontally oriented. For example, the coating portion may coat a portion of the eye piece (e.g., a horizontally oriented band of the eyepiece), such that a length of the coating portion in a horizontal direction is greater than a length of the coating portion in the vertical direction. In this way, the coating portion may be utilized to direct light toward the pupil along a horizontal axis. In some aspects, the turning portion may be vertically oriented, to determine a gaze direction of the pupil of the eye on the vertical axis.

In some aspects, multiple turning portions may be included in the light guide, such as a plurality of horizontally oriented coating portions (e.g., parallel bands of coating portions) or a plurality of vertically oriented coating portions (e.g., parallel bands of coating portions) to enable a determination of a gaze direction along the horizontal axis and the vertical axis. For example, for a set of two parallel horizontally oriented coating portions, sensor device 110 may determine a vertical axis gaze direction based at least in part on determining which of the two coating portions is associated with causing a greater intensity of light to be reflected by the pupil of the eye. In some aspects, sensor device 110 may determine a gaze direction using a single coating portion. For example, for a single horizontally oriented coating portion, based at least in part on intensity of reflected light exceeding a threshold, sensor device 110 may determine a gaze direction, in a vertical axis, aligned to a horizontally oriented coating portion (e.g., a gaze in a direction of the single horizontally oriented coating portion). In this case, based at least in part on intensity being less than the threshold, sensor device 110 may determine a gaze direction, in the vertical axis, not aligned to the horizontally oriented coating portion (e.g., a gaze direction in a direction above or below the single horizontally oriented coating portion). In some aspects, sensor device 110 may be coupled to one or more horizontally oriented coating portions and one or more vertically oriented coating portions. In some aspects, sensor device 110 may be coupled to another orientation of coating portion. In this way, sensor device 110 may determine the gaze direction in one axis, two axes, and/or the like.

In some aspects, the turning element may cause light to be directed out of the light guide and/or the eyepiece of the pair of eyeglasses. For example, the turning element may be configured to cause a portion of light striking a surface of the turning element to be directed in a plurality of directions toward the pupil of the eye. In this way, a system including sensor device 110 and the light guide may direct light from an emitter to the pupil of the eye. In this case, light may be reflected by, for example, the pupil, a retina of the eye, or the like, to form Lambertian reflected light (e.g., reflected light that is reflected at a plurality of different angles).

As further shown in FIGS. 3A and 3B, and by reference number 330, the light guide may receive the reflected light from the pupil of the eye, and may direct the reflected light toward sensor device 110 (e.g., a receiver). For example, the coating portion of the turning portion of the light guide may cause light received over a plurality of different angles to be directed through the coating portion and/or the eyepiece of the pair of eyeglasses and to the directing portion of the light guide. In this case, the coating portion may be wavelength sensitive and/or incident angle sensitive, such that portions of light within a threshold range of angles of incidence and/or within a threshold wavelength range are turned into the eyepiece and toward the directing portion. As shown by reference number 340, sensor device 110 (e.g., the receiver) may receive the reflected light and may determine a gaze direction based at least in part on the received reflected light. For example, based at least in part on an angle of incidence, an intensity, and/or a spatial position of incidence of the reflected light, sensor device 110 may determine the gaze direction.

As indicated above, FIGS. 3A and 3B are provided merely as examples. Other examples are possible and may differ from what was described with regard to FIGS. 3A and 3B.

Figure 4:
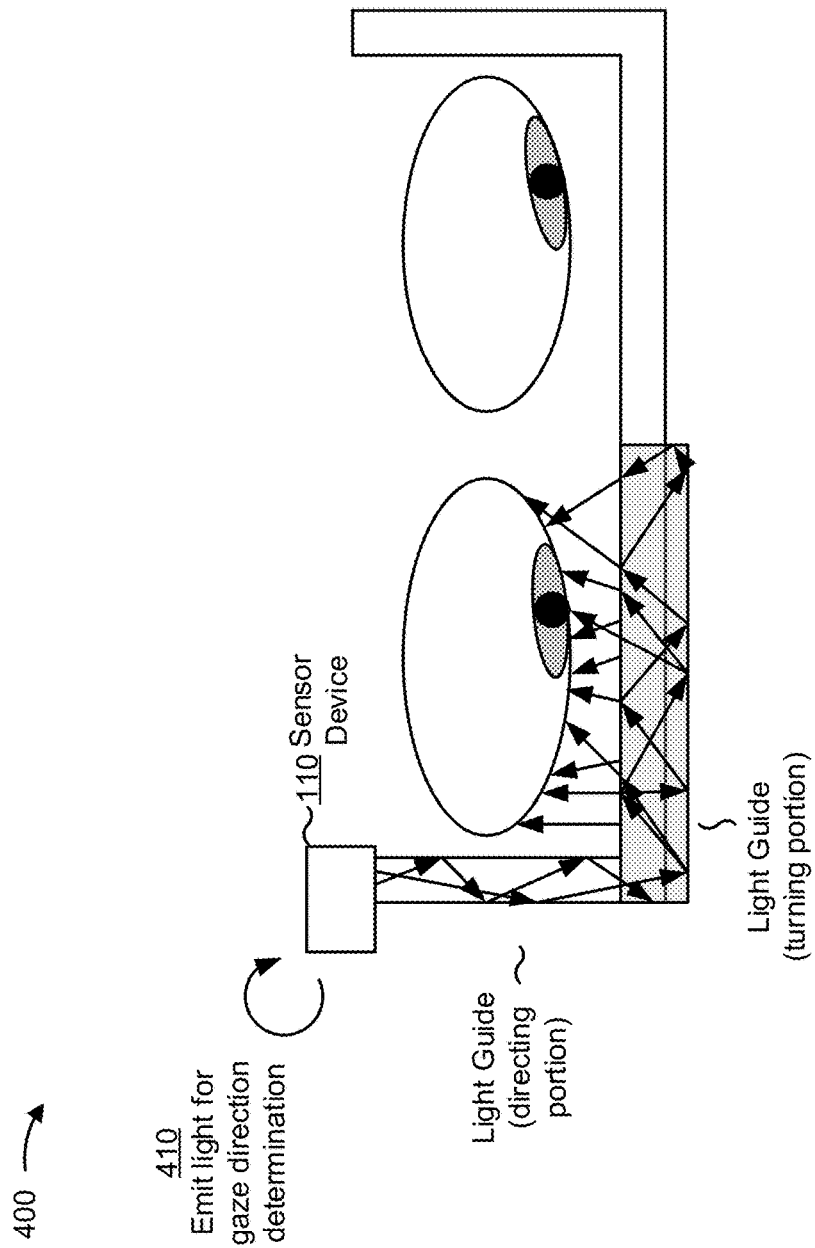
FIG. 4 is a diagram of an example of determining a gaze direction using a system for eye tracking, in accordance with various aspects of the present disclosure.

FIG. 4 is a diagram of an example aspect 400. FIG. 4 shows an example of determining a gaze direction using a system for eye tracking.

As shown in FIG. 4, and by reference number 410, sensor device 110 emits light to be directed toward a pupil of an eye via a light guide. In some aspects, the emitted light may be emitted so that the light is strikes the eye over a plurality of different angles. For example, sensor device 110 may emit the light at a plurality of different angles, which may cause portions of the light to be diffracted and/or reflected when being directed toward the pupil of the eye by the light guide (e.g., by a directing portion and a turning portion). In this case, based at least in part on the light diffracting and/or reflecting off of the turning portion (e.g., at least a portion of light diffracting and/or reflecting off a coating portion that is coated onto an eyepiece and, in some aspects, a portion of light being passed through the coating portion) within a threshold range of angles, the light may be caused to exit the eyepiece in a direction of the eye. In this way, a system including sensor device 110 and the light guide ensure that light is directed into the pupil of the eye to be reflected out for a gaze direction determination.

As indicated above, FIG. 4 is provided merely as an example. Other examples are possible and may differ from what was described with regard to FIG. 4.

FIGS. 5A and 5B are diagrams of an example aspect 500. FIGS. 5A and 5B show an example of determining a gaze direction using a system for eye tracking.

As shown in FIG. 5A, and by reference number 510, sensor device 110 emits a first light toward a light guide. The first light is directed via the light guide (e.g., a directing portion and a turning portion) toward the pupil of the eye, and strikes the pupil of the eye, which is positioned at a first gaze direction. As shown by reference number 520, the first light is reflected by a surface of the pupil of the eye toward the light guide (e.g., toward the coating portion and eyepiece forming the turning portion of the light guide) at a first angle, and is directed by the light guide to sensor device 110. Based at least in part on detecting the first reflected light at a first angle of incidence and/or a first spatial position of incidence, sensor device 110 may determine the first gaze direction of the pupil.

As shown in FIG. 5B, and by reference number 530, sensor device 110 emits a second light toward the light guide. The second light is directed via the light guide toward the pupil of the eye, and strikes the pupil of the eye, which is positioned at a second gaze direction. As shown by reference number 540, the second light is reflected by the surface of the pupil of the eye toward the light guide, and is directed by the light guide to sensor device 110. In this case, sensor device 110 detects the second reflected light at a second angle of incidence and/or a second spatial position of incidence that is different from the first angle of incidence and/or the first spatial position, respectively, based at least in part on the angle of incidence and/or the spatial position corresponding to the gaze direction. In some aspects, the turning portion may be configured to reflect light that is normally incident at different angles based at least in part on a spatial position of the light (e.g., a spatial position of the pupil of the eye that reflected the light). For example, an angularly selective holographic coating may cause first light incident at a first location to be turned into the eyepiece toward the directing portion at a first angle, and may cause second incident light at a second location to be turned into the directing portion at a second angle. In this case, the directing portion may cause an angle of incidence of the first light and the second light to be different at sensor device 110. In other words, the angularly selective holographic coating (e.g., a coating portion) may diffract normally incident light (or another selected single angle of light) into different directions based at least in part on a spatial position on the angularly selectively holographic coating at which the normally incident light (or the other selected single angle of light) is incident. Based at least in part on detecting the second reflected light at the second angle of incidence and/or the second spatial position of incidence, sensor device 110 may determine the second gaze direction of the pupil. In some aspects, a wavelength selective holographic coating may change a wavelength of the reflected light as a function of spatial position on the holographic coating, which may enable sensor device 110 to determine the position of the reflected light from the pupil based at least in part on the wavelength of the reflected light.

In some aspects, sensor device 110 may determine the gaze direction based at least in part on a pattern of incident light on sensor device 110 (e.g., the receiver). For example, at the first gaze direction, sensor device 110 may receive a first pattern of light rays (e.g., a first set of light rays associated with a first set of angles of incidence, a first set of spatial positions, a first set of intensities, etc.), which may cause sensor device 110 to determine the first gaze direction. Similarly, at a second gaze direction, sensor device 110 may receive a second pattern of light rays, which may cause sensor device 110 to determine the second gaze direction. In some aspects, sensor device 110 may determine the gaze direction using a computing technique. For example, sensor device 110 may utilize a regression algorithm, a computer vision algorithm, a machine learning regression model, a neural network (e.g., a convolutional neural network), or another computing technique to determine the gaze direction based at least in part on the received light.

As indicated above, FIGS. 5A and 5B are provided merely as examples. Other examples are possible and may differ from what was described with regard to FIGS. 5A and 5B.

FIG. 6 is a flow chart of an example process 600 for determining a gaze direction using a system for eye tracking. In some aspects, one or more process blocks of FIG. 6 may be performed by sensor device 110. In some aspects, one or more process blocks of FIG. 6 may be performed by another device or a group of devices separate from or including sensor device 110, such as control device 120.

As shown in FIG. 6, process 600 may include transmitting light toward a target (block 610). For example, sensor device 110 may transmit light toward the target. In some aspects, sensor device 110 may transmit the light toward a pupil of an eye. For example, sensor device 110 may transmit the light toward a directing portion of a light guide, which may direct the light toward a turning portion of the light guide. In this case, the turning portion of the light guide may direct the light toward the pupil of the eye.

As further shown in FIG. 6, process 600 may include receiving reflected light based at least in part on transmitting the light toward the target (block 620). For example, sensor device 110 may receive the reflected light based at least in part on transmitting the light toward the target. In some aspects, sensor device 110 may receive the reflected light based at least in part on transmitting the light toward the pupil of the eye. For example, sensor device 110 may receive the reflected light based at least in part on the reflected light being directed by the turning portion of the light guide to the directing portion of the light guide, and by the directing portion to sensor device 110.

As further shown in FIG. 6, process 600 may include determining target information based at least in part on receiving the reflected light from the target (block 630). For example, sensor device 110 may determine target information based at least in part on receiving the reflected light from the target. In some aspects, sensor device 110 may determine a gaze direction. For example, sensor device 110 may determine the gaze direction based at least in part on receiving the reflected light from the pupil of the eye.

Process 600 may include additional aspects, such as any single aspect or any combination of aspects described below and/or in connection with one or more other processes described elsewhere herein.

In some aspects, an emitter of sensor device 110 is an infrared light emitting diode. In some aspects, a turning portion of sensor device 110 includes at least one of a holographic film attached to an eyepiece, a micro-structured element, a surface relief diffractive element, or a mirror. In some aspects, a turning portion of sensor device 110 is aligned to within a threshold proximity of a center point of the eye. In some aspects, a turning portion of sensor device 110 is configured to direct the light so that the light strikes the eye over a plurality of different angles. In some aspects, the reflected light is reflected by the eye over a plurality of different angles.

In some aspects, sensor device 110 is configured to determine the gaze direction based at least in part on an angle of incidence of the reflected light on the turning portion or a wavelength of the reflected light at incidence with the turning portion. In some aspects, a path of the reflected light through the directing portion toward the receiver is related to a position of the pupil of the eye. In some aspects, sensor device 110 is configured to determine the gaze direction based at least in part on an angle of incidence or a spatial position of incidence of the reflected light on the receiver.

In some aspects, a receiver of sensor device 110 is a pseudo imaging sensor. In some aspects, sensor device 110 is configured to determine the gaze direction based at least in part on a pattern of incident light on the receiver In some aspects, sensor device 110 is configured to determine the gaze direction based at least in part on at least one of a regression algorithm, a computer vision algorithm, a machine learning regression model, or a neural network.

In some aspects, a light guide of sensor device 110 is a fiber bundle with a collection lens configured to image the reflected light onto a collection end of the fiber bundle and toward the receiver. In some aspects, a fiber bundle of sensor device 110 includes a non-uniform distribution of fibers. In some aspects, a turning portion of sensor device 110 is horizontally distributed on an eyepiece aligned to the eye.

In some aspects, a turning portion of sensor device 110 is vertically distributed on an eyepiece aligned to the eye. In some aspects, a turning portion of sensor device 110 comprises a plurality of rows or a plurality of columns of turning portions. In some aspects, sensor device 110 is configured to determine the gaze direction in one axis.

In some aspects, sensor device 110 is configured to determine the gaze direction in a two axes. In some aspects, sensor device 110 is configured to determine the gaze direction based at least in part on an intensity of the reflected light. In some aspects, sensor device 110 includes an eyeglass structure including at least one eyepiece.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

In this way, some aspects, described herein, may improve an accuracy, reduce a computational complexity, reduce an energy consumption, and/or the like associated with gaze direction determination relative to other techniques for gaze direction determination.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, and/or a combination of hardware and software.

Some aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based at least in part on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A system, comprising:
   an emitter configured to emit a light;
   a light guide configured to direct the light toward a pupil of an eye,
      the light guide including a directing portion configured to propagate the light, and
      the light guide including a turning portion configured to receive light from the directing portion and direct the light toward the pupil of the eye and configured to receive reflected light directed from the pupil of the eye and direct the reflected light toward the directing portion;
   a receiver configured to receive the reflected light from the light guide; and
   a processor configured to determine a first gaze direction of the pupil of the eye based at least in part on a pattern of light rays, of the reflected light received by the receiver, being a first set of light rays associated with a first set of angles of incidence,
      the processor further configured to determine a second gaze direction based at least in part on the pattern of light rays being a second set of light rays associated with a second set of angles of incidence.

2. The system of claim 1, wherein the emitter is an infrared light emitting diode.

3. The system of claim 1, wherein the turning portion includes at least one of:
   a holographic film attached to an eyepiece;
   a micro-structured element,
   a surface relief diffractive element, or
   a mirror.

4. The system of claim 1, wherein the turning portion is aligned to within a threshold proximity of a center point of the eye.

5. The system of claim 1, wherein the turning portion is configured to direct the light so that the light strikes the eye over a plurality of different angles.

6. The system of claim 1, wherein the reflected light is reflected by the eye over a plurality of different angles.

7. The system of claim 1, wherein the light guide is configured to diffract a single angle of light incident to the light guide into differing directions based at least in part on a portion of the light guide on which the single angle of light is incident and wherein the processor is configured to determine the gaze direction based at least in part on an angle of incidence of the reflected light on the turning portion or a wavelength of the reflected light at incidence with the turning portion.

8. The system of claim 1, wherein a path of the reflected light through the directing portion toward the receiver is related to a position of the pupil of the eye.

9. The system of claim 1, wherein light guide configured to cause the reflected light to be incident on the receiver at a spatial position of incidence of the reflected light on the receiver corresponding to the gaze direction and wherein the processor is configured to determine the gaze direction based at least in part on an angle of incidence or the spatial position of incidence of the reflected light on the receiver.

10. The system of claim 1, wherein the receiver is a pseudo imaging sensor.

11. The system of claim 1, wherein the processor is configured to determine the gaze direction based at least in part on at least one of:
   a regression algorithm,
   a computer vision algorithm,
   a machine learning regression model, or
   a neural network.

12. The system of claim 1, wherein the light guide is a fiber bundle with a collection lens configured to image the reflected light onto a collection end of the fiber bundle and toward the receiver.

13. The system of claim 12, wherein the fiber bundle includes a non-uniform distribution of fibers.

14. The system of claim 1, wherein the turning portion is horizontally distributed on an eyepiece aligned to the eye.

15. The system of claim 1, wherein the turning portion is vertically distributed on an eyepiece aligned to the eye.

16. The system of claim 1, wherein the turning portion comprises a plurality of rows or a plurality of columns of turning portions.

17. The system of claim 1, wherein the processor is configured to determine the gaze direction in one axis.

18. The system of claim 1, wherein the processor is configured to determine the gaze direction in a two axes.

19. The system of claim 1, wherein the processor is configured to determine the gaze direction based at least in part on an intensity of the reflected light.

20. The system of claim 1, wherein the system comprises an eyeglass structure,
the eyeglass structure including at least one eyepiece.

21. A method, comprising:
transmitting, by a device, light toward a pupil of an eye,
wherein the light is directed by a directing portion of a light guide to a turning portion of the light guide,
wherein the light is directed toward the pupil of the eye by the turning portion,
wherein reflected light is directed by the turning portion to the directing portion, and
wherein the reflected light is directed by the directing portion to a receiver;
receiving, by the device, the reflected light based at least in part on transmitting the light toward the pupil of the eye; and
determining, by the device and after receiving the reflected light, a first gaze direction of the pupil of the eye based at least in part on a pattern of light rays, of the reflected light, being a first set of light rays associated with a first set of angles of incidence,
a second gaze direction being determined based at least in part on the pattern of light rays being a second set of light rays associated with a second set of angles of incidence.

22. The method of claim 21, wherein the light is transmitted by an infrared light emitting diode of the device.

23. The method of claim 21, wherein the turning portion includes at least one of:
a holographic film attached to an eyepiece;
a micro-structured element,
a surface relief diffractive element, or
a mirror.

24. A non-transitory computer-readable medium, comprising:
one or more instructions that, when executed by one or more processors of a device, cause the one or more processors to:
cause the device to transmit light toward a pupil of an eye,
wherein the light is directed by a directing portion of a light guide to a turning portion of the light guide,
wherein the light is directed toward the pupil of the eye by the turning portion,
wherein reflected light is directed by the turning portion to the directing portion, and
wherein the reflected light is directed by the directing portion to a receiver;
cause the device to receive the reflected light based at least in part on transmitting the light toward the pupil of the eye; and
determine a first gaze direction based at least in part on a pattern of light rays, of the reflected light, being a first set of light rays associated with a first set of angles of incidence,
a second gaze direction being determined based at least in part on the pattern of light rays being a second set of light rays associated with a second set of angles of incidence.

25. The non-transitory computer-readable medium of claim 24, wherein the light is transmitted by an infrared light emitting diode of the device.

26. The non-transitory computer-readable medium of claim 24, wherein the turning portion includes at least one of:
a holographic film attached to an eyepiece;
a micro-structured element,
a surface relief diffractive element, or
a mirror.

27. An apparatus, comprising:
means for transmitting light toward a pupil of an eye,
wherein the light is directed by a directing portion of a light guide to a turning portion of the light guide,
wherein the light is directed toward the pupil of the eye by the turning portion,
wherein reflected light is directed by the turning portion to the directing portion, and
wherein the reflected light is directed by the directing portion to a receiver;
means for receiving the reflected light based at least in part on transmitting the light toward the pupil of the eye; and
means for determining a first gaze direction of the pupil of the eye based at least in part on a pattern of light rays, of the reflected light, being a first set of light rays associated with a first set of angles of incidence; and
means for determining a second gaze direction based at least in part on the pattern of light rays being a second set of light rays associated with a second set of angles of incidence.

28. The apparatus of claim 27, wherein the means for transmitting include an infrared light emitting diode.

29. The apparatus of claim 27, wherein the turning portion includes at least one of:
a holographic film attached to an eyepiece;
a micro-structured element,
a surface relief diffractive element, or
a mirror.

30. The apparatus of claim 27, wherein a length of a coating portion, of the turning portion, in a horizontal direction is greater than a length of the coating portion in a vertical direction.

* * * * *